United States Patent
Floriani et al.

(10) Patent No.: US 12,455,583 B2
(45) Date of Patent: Oct. 28, 2025

(54) CONTROL DEVICE FOR A SWITCHING VOLTAGE REGULATOR AND SWITCHING VOLTAGE REGULATOR

(71) Applicant: STMicroelectronics S.r.l., Agrate Brianza (IT)

(72) Inventors: Ivan Floriani, Milan (IT); Elena Brigo, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 241 days.

(21) Appl. No.: 18/298,758

(22) Filed: Apr. 11, 2023

(65) Prior Publication Data

US 2023/0359235 A1 Nov. 9, 2023

(30) Foreign Application Priority Data

May 3, 2022 (IT) .................. 102022000008930

(51) Int. Cl.
*H02M 3/158* (2006.01)
*G05F 1/575* (2006.01)
*G05F 1/595* (2006.01)
*H02M 1/00* (2006.01)

(52) U.S. Cl.
CPC .............. *G05F 1/575* (2013.01); *G05F 1/595* (2013.01); *H02M 1/0009* (2021.05); *H02M 3/1582* (2013.01)

(58) Field of Classification Search
CPC ...... G05F 1/575; G05F 1/595; H02M 1/0009; H02M 3/1582
See application file for complete search history.

(56) References Cited

U.S. PATENT DOCUMENTS

| 2014/0203761 A1 | 7/2014 | Paparrizos et al. |
| 2022/0083112 A1 | 3/2022 | Konduru |
| 2023/0421039 A1* | 12/2023 | Castorina ............ H02M 1/0019 |

(Continued)

OTHER PUBLICATIONS

Berba, Farag et al., "A New Approach of Prevention of DC Current Component in Transformerless Grid-Connected PV Inverter Application", IEEE 5th International Symposium on Power Electronics for Distributed Generation Systems (PEDG), Jun. 24-27, 2014, 10 pages.

(Continued)

*Primary Examiner* — Adolf D Berhane
(74) *Attorney, Agent, or Firm* — Slater Matsil, LLP

(57) ABSTRACT

A control device for a switching voltage regulator includes: a first detector of a first measurement signal indicative of a current flowing in a first side of the regulator, and providing a first comparison signal as a function of a first threshold; a second detector of a second measurement signal indicative of a current flowing in a second side of the regulator, and providing a second comparison signal as a function of a second threshold; a driving-signal generation circuit which generates a switching control signal from the first comparison signal to drive the switching circuit; a calibration circuit which receives an alert signal indicative of the first threshold, compares the alert signal and the second comparison signal, and provides a calibration signal in response; and a feedback circuit which provides a control signal as a function of an error signal and of the calibration signal.

20 Claims, 8 Drawing Sheets

(56) References Cited

U.S. PATENT DOCUMENTS

2024/0210978 A1\* 6/2024 Floriani .................. G05F 1/575
2025/0079992 A1\* 3/2025 Floriani .............. H02M 3/1582
2025/0079993 A1\* 3/2025 Floriani .................. H02M 1/14

OTHER PUBLICATIONS

Antivacis, Michael et al., "Three-phase buck-boost Y-inverter with wide D input voltage range", 2018 IEEE Applied Power Electronics Conference And Exposition (APEC), IEEE, Mar. 4, 2018 (Mar. 4, 2018), pp. 1492-1499.

Debnath, Dipankar et al, "A Buck-Boost Integrated Full Bridge Inverter For Solar Photovoltaic Based Standalone System", 2013 IEEE 39th Photovoltaic Specialists Conference (PvSC), IEEE, Jun. 16, 2013, pp. 2867-2872.

\* cited by examiner

CONTROL DEVICE FOR A SWITCHING VOLTAGE REGULATOR AND SWITCHING VOLTAGE REGULATOR

CROSS-REFERENCE TO RELATED APPLICATIONS

This application claims the benefit of Italian Patent Application No. 102022000008930, filed on May 3, 2022, which application is hereby incorporated herein by reference.

TECHNICAL FIELD

The present disclosure relates to a control device for a switching voltage regulator and to a switching voltage regulator.

BACKGROUND

As is known, a switching voltage regulator is capable of converting an input direct voltage (DC) into an output direct voltage using different operating schemes and may be obtained using different topologies. One of the most common switching voltage regulator topologies is the is the four-switch non-inverting topology.

SUMMARY

Embodiments of the present disclosure include a control device for a switching voltage regulator, a switching voltage regulator and a control method for a switching voltage regulator.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

Figures 1, 2:
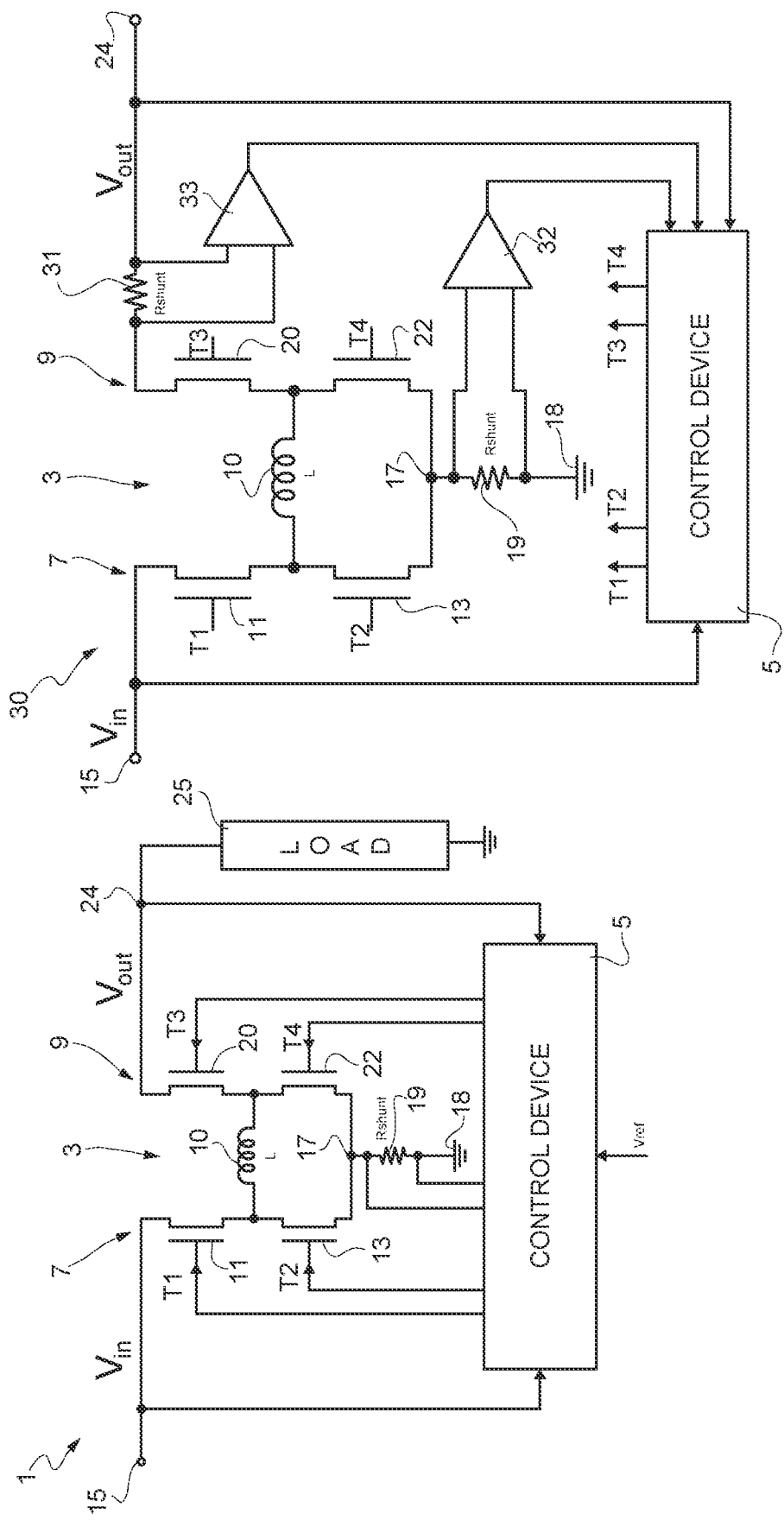
FIGS. 1 and 2 show block diagrams of known switching voltage regulators.

FIG. 1 shows a switching voltage regulator 1 comprising a four-switch non-inverting switching circuit, hereinafter referred to as switching circuit 3, and a control device 5. The switching circuit 3 is formed by a first half-bridge 7, a second half-bridge 9 and an inductor 10. The first half-bridge 7 is formed by a first high-side switch 11 and a first low-side switch 13, here two N-MOS transistors, coupled in series between an input terminal 15 and a common node 17.

The common node 17 is coupled to a reference potential line (ground) 18 through a shunt resistor 19. An input voltage Vin with respect to the ground 18 is applied to the input terminal 15.

The second half-bridge 9 is formed by a second high-side switch 20 and a second low-side switch 22, also here two N-MOS transistors, coupled in series between an output node 24 and the common node 17. An output voltage $V_{out}$, referred to the ground 18, is present at the output node 24 and is applied to a load 25. The inductor 10 is coupled between an intermediate node of the first half-bridge 7 and an intermediate node of the second half-bridge 9.

As a function of the ratio between the input voltage $V_{in}$ and the output voltage $V_{out}$, the switching voltage regulator 1 may work in one of three operating modes, also known as "buck" if $V_{in}>V_{out}$, "boost" if $V_{in}<V_{out}$ and "buck-boost" if $V_{in}\sim V_{out}$. Depending on the operating mode, by suitably controlling the switching of the first and the second half-bridges 7, 9, it is in fact possible to cause the output voltage $V_{out}$ to remain at a reference voltage $V_{ref}$ chosen for example by a user depending on a specific application, regardless of the value of the input voltage $V_{in}$. For this purpose, the control device 5 is coupled to the input node 15 and to the output node 24 and receives the reference voltage $V_{ref}$.

Starting from the input voltage $V_{in}$, the output voltage $V_{out}$ and the reference voltage $V_{ref}$, the control device 5 determines the operating mode of the switching voltage regulator 1 and generates four switch control signals T1, T2, T3, T4, which control the switching respectively of the first high-side switch 11, the first low-side switch 13, the second high-side switch 20 and the second low-side switch 22.

In detail, the control device 5 forms a loop control circuit configured to measure an error between the output voltage $V_{out}$ and the reference voltage $V_{ref}$, generate a correction signal that compensates for the error, and modify the switch control signals T1, T2, T3, T4 so that the output voltage $V_{out}$ remains equal to the reference voltage $V_{ref}$.

It is known to design the control device 5 so that the operation of the regulator 1 is current- or voltage-controlled. The current control is typically preferred with respect to the voltage control, as it allows limiting a maximum current that may flow in the switching circuit 3, for example the maximum current flowing through the inductor 10.

With reference to the regulator 1 of FIG. 1, in order to perform a current control, the control device 5 also senses, in use, a current flowing through the shunt resistor 19. The fact that the shunt resistor 19 is arranged between the common node 17 and the ground 18 allows the control device 5 to sense a current flowing in the switching circuit 3, only if this current also flows through the shunt resistor 19.

In buck, boost or buck-boost modes, it is known to drive the switches 11, 13, 20 and 22 so that the regulator 1 alternates an ON-phase, wherein the inductor current increases, and an OFF-phase, wherein the inductor current decreases. In buck mode, the inductor current flows through the shunt resistor 19 only during the OFF-phase of the regulator 1. Furthermore, when the regulator 1 is in a pass-through mode, i.e. in a mode wherein the regulator does not oscillate between the ON-phase and the OFF-phase and the switches 11, 20 are maintained closed and the switches 13, 22 are maintained open, the inductor current does not flow through the shunt resistor 19. Consequently, the control device 5 is not capable of always controlling the value of current flowing through the inductor 10 and, in particular, controlling the maximum value thereof.

According to other approaches not shown, the shunt resistor may be arranged in series with the inductor 10, i.e. between the intermediate node of the first and the second half-bridges 7, 9, or on the high side of the switching circuit 3, for example between the input node 15 and the first high-side switch 11. However, in such approaches, a current always flows, in use, through the shunt resistor. For example, when the regulator is in buck mode, the inductor current flows through the shunt resistor in both the ON-phase and the OFF-phase. Consequently, such approaches have a high energy consumption.

Furthermore, in such approaches, sensing the current flowing in the shunt resistor requires a more complex and expensive design than sensing the current of the shunt resistor 19 of FIG. 1.

In some applications, for safety reasons, for example in the automotive field, it is desired to measure, in use, both the current flowing in the high side of the switching circuit (e.g., through the first or the second high-side switch 11, 20 of FIG. 1), and the current flowing in the low side of the switching circuit (i.e., through the first or the second low-side switch 13, 22 of FIG. 1).

In this regard, FIG. 2 shows a regulator 30 of known type incorporating a first and a second shunt resistor 19, 31. The first shunt resistor 19 is arranged in the low side of the switching circuit 3, between the common node 17 and the ground 18. The second shunt resistor 31 is arranged in the high side of the switching circuit 3, between the second high-side switch 20 and the output node 24.

The regulator 30 further comprises a first and a second current detector 32, 33 coupled respectively to the first and the second shunt resistors 19, 31. However, the presence of two shunt resistors causes a high energy consumption and a high cost of the regulator 30.

Figure 3:
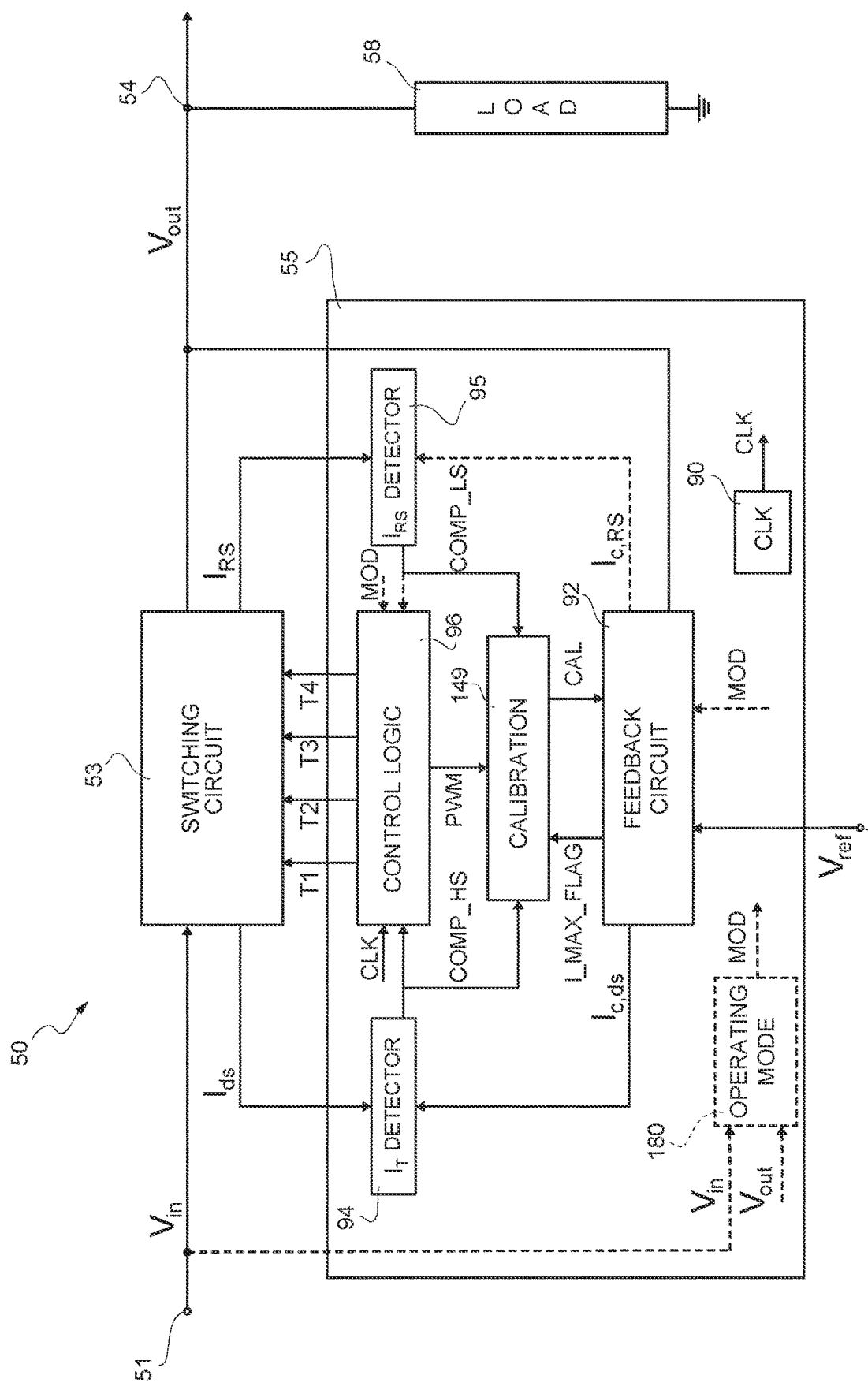
FIG. 3 shows a block diagram of the present voltage regulator, according to an embodiment.

FIG. 3 shows a block diagram of a switching voltage regulator 50, hereinafter also simply referred to as regulator 50, comprising a switching circuit 53 and a control device 55, mutually coupled. The regulator 50 has an input node 51 wherefrom it receives an input voltage $V_{in}$, a reference node 52 wherefrom it receives a nominal or reference voltage $V_{ref}$, and an output node 54 whereto it provides an output voltage $V_{out}$. A load 58 is coupled to the output node 54 of the regulator 50.

In detail, the regulator 50 is a buck-boost DC-DC converter, configured to generate the output voltage $V_{out}$ from the input voltage $V_{in}$, so that the output voltage $V_{out}$ is equal to the reference voltage $V_{ref}$, which may be chosen by a user according to the specific application.

Figure 4:
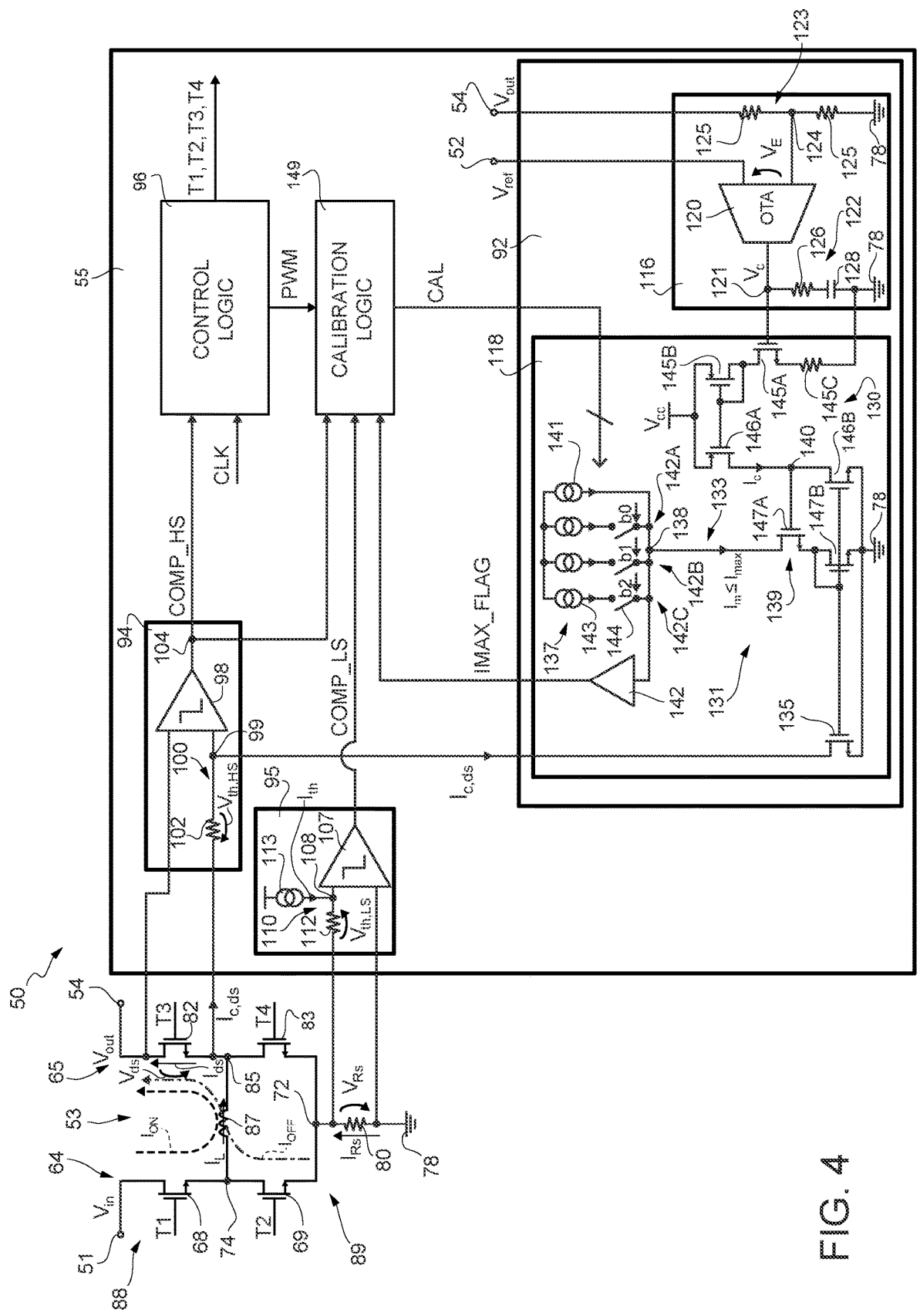
FIG. 4 shows a detailed circuit diagram of the voltage regulator of FIG. 3.

The switching circuit 53 and the control device 55 may be integrated in a same die or formed in different dice. The switching circuit 53, shown in detail in FIG. 4, is here a four-switch non-inverting circuit, in particular configured to operate in buck, boost or buck-boost mode, depending on whether the input voltage $V_{in}$ is respectively higher than, lower than or approximately equal to the output voltage $V_{out}$ (or the reference voltage $V_{ref}$).

The control device 55 is described hereinbelow, with reference to FIGS. 4-7, in the buck operating mode of the regulator 50. However, as will be clear to the person skilled in the art, the control device 55 may also be used in the boost and buck-boost operating modes of the regulator 50.

In detail, the switching circuit 53 is formed by a first half-bridge 64 and a second half-bridge 65. The first half-bridge 64 is formed by a first high-side switch 68 and a first low-side switch 69, here two N-MOS transistors, coupled in series between the input node 51 and a common node 72.

In detail, the first high-side switch 68 is coupled between the input node 51 and an intermediate node 74 of the first half-bridge 64 and the first low-side switch 69 is coupled between the intermediate node 74 of the first half-bridge 64 and the common node 72. The input node 51 is at the input voltage $V_{in}$ with respect to a reference potential line (ground) 78. The common node 72 is coupled to the ground 78 through a shunt resistor 80 having resistance $R_S$.

The second half-bridge 65 is formed by a second high-side switch 82 and a second low-side switch 83, also here two N-MOS transistors, coupled in series between the output node 54 and the common node 72. In detail, the second high-side switch 82 is coupled between the output node 54 and an intermediate node 85 of the second half-bridge 65 and the second low-side switch 83 is coupled between the intermediate node 85 of the second half-bridge 65 and the common node 72. The output node 54 provides the output voltage $V_{out}$, with respect to the ground 78.

The switching circuit 53 also comprises an inductor 87 having inductance L and coupled between the intermediate node 74 of the first half-bridge 64 and the intermediate node 85 of the second half-bridge 65.

The first high-side switch 68, the first low-side switch 69, the second high-side switch 82, and the second low-side switch 83 are each controlled by a respective switch control signal T1, T2, T3, T4. In practice, the switching circuit 53 has a high side 88 extending, from an electrical point of view, between the intermediate nodes 74, 85 and the input and output nodes 51, 54, and a low side 89 extending, from an electrical point of view, between the intermediate nodes 74, 85 and the ground 78.

In this embodiment, the first and the second high-side switches 68, 82 are arranged in the high side 88 of the switching circuit 53, the first and the second low-side switches 69, 83 and the shunt resistor 80 are arranged in the low side 89 of the switching circuit 53.

The control device 55 is configured to perform a current control of the switching circuit 53. The control device 55 is coupled to the output node 54 and to the reference node 52. Furthermore, the control device 55 is coupled to both the high side 88 and the low side 89 of the switching circuit 53, so as to sense a signal indicative of the current flowing, in use, in the high side 88 and, respectively, in the low side 89 of the switching circuit 53.

In detail, here, the control device 55 is coupled to the shunt resistor 80 and to the second high-side switch 82, so as to sense a signal indicative of the shunt current $I_{RS}$ flowing, in use, through the shunt resistor 80 and, respectively, a signal indicative of the switch current $I_{ds}$ flowing, in use, through the second high-side switch 82.

The control device 55 comprises a clock 90, which provides a clock signal CLK, for example a periodic square wave signal. In this embodiment, the clock signal CLK has a fixed period T.

With reference to FIGS. 3 and 4, the control device 55 further comprises a feedback circuit or module 92 coupled to the output node 54 and to the reference node 52, a high-side current detector 94 coupled to the second high-side transistor 82, a low-side current detector 95 coupled to the shunt resistor 80, and a control logic circuit or module 96 providing the switch control signals T1, T2, T3, T4. The feedback circuit 92 receives the output voltage $V_{out}$, the reference voltage $V_{ref}$ and a calibration signal CAL and provides a loop control current $I_{c,ds}$ which is a function of the calibration signal CAL and of an error signal $V_E$ indicative of the difference between the output voltage $V_{out}$ and the reference voltage $V_{ref}$. The feedback circuit 92 provides the loop control current $I_{c,ds}$ to the high-side current detector 94.

The high-side current detector 94 measures the switch current $I_{ds}$ flowing, in use, through the second high-side switch 82, and provides a high-side comparison signal COMP_HS indicative of the switch current $I_{ds}$. The low-side current detector 95 measures the shunt current $I_{RS}$ flowing, in use, through the shunt resistor 80, and provides a low-side comparison signal COMP_LS indicative of the shunt current $I_{RS}$.

The control logic circuit 96 receives the clock signal CLK and the high-side comparison signal COMP_HS and provides a modulated signal PWM, as described in detail below. The modulated signal PWM has a fixed period, which is a function of the period T of the clock signal CLK, and a duty cycle, which is variable at each cycle (or period) of the modulated signal PWM.

Figure 6:
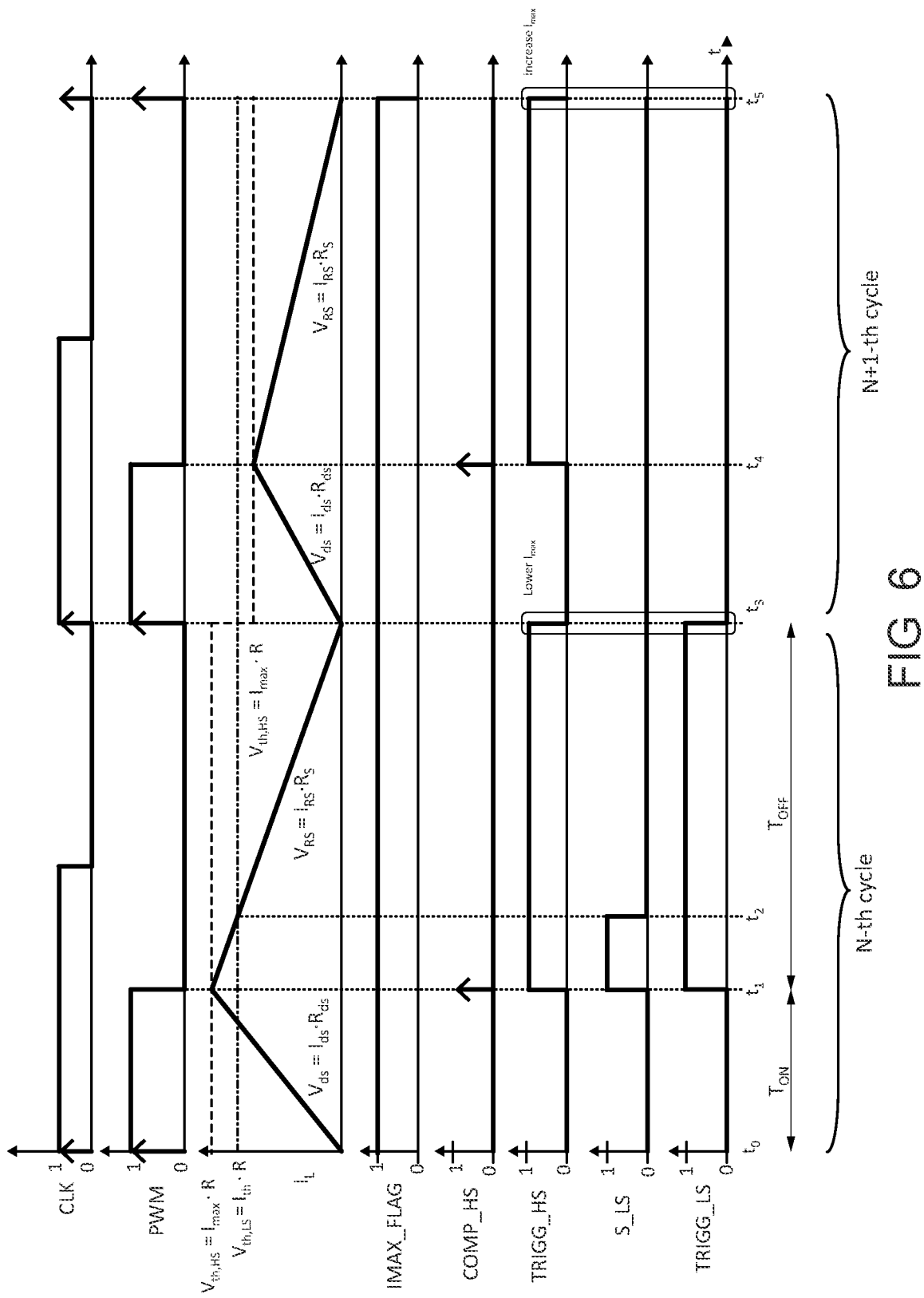
FIG. 6 shows an example of waveforms of the voltage regulator of FIG. 4, in use.

In this embodiment, as shown for example in the plot of FIG. 6, the period of the modulated signal PWM is equal to the period T of the clock signal CLK; however, the period of the modulated signal PWM may be different from the period of the clock signal CLK, for example it may be a multiple of the period of the clock signal CLK. In this embodiment, the rising edges of the modulated signal PWM are time synchronized with the rising edges of the clock signal CLK.

The control logic circuit 96 modifies, in use, the duty cycle of the modulated signal PWM as a function of the high-side comparison signal COMP_HS, as described below.

Figure 7:
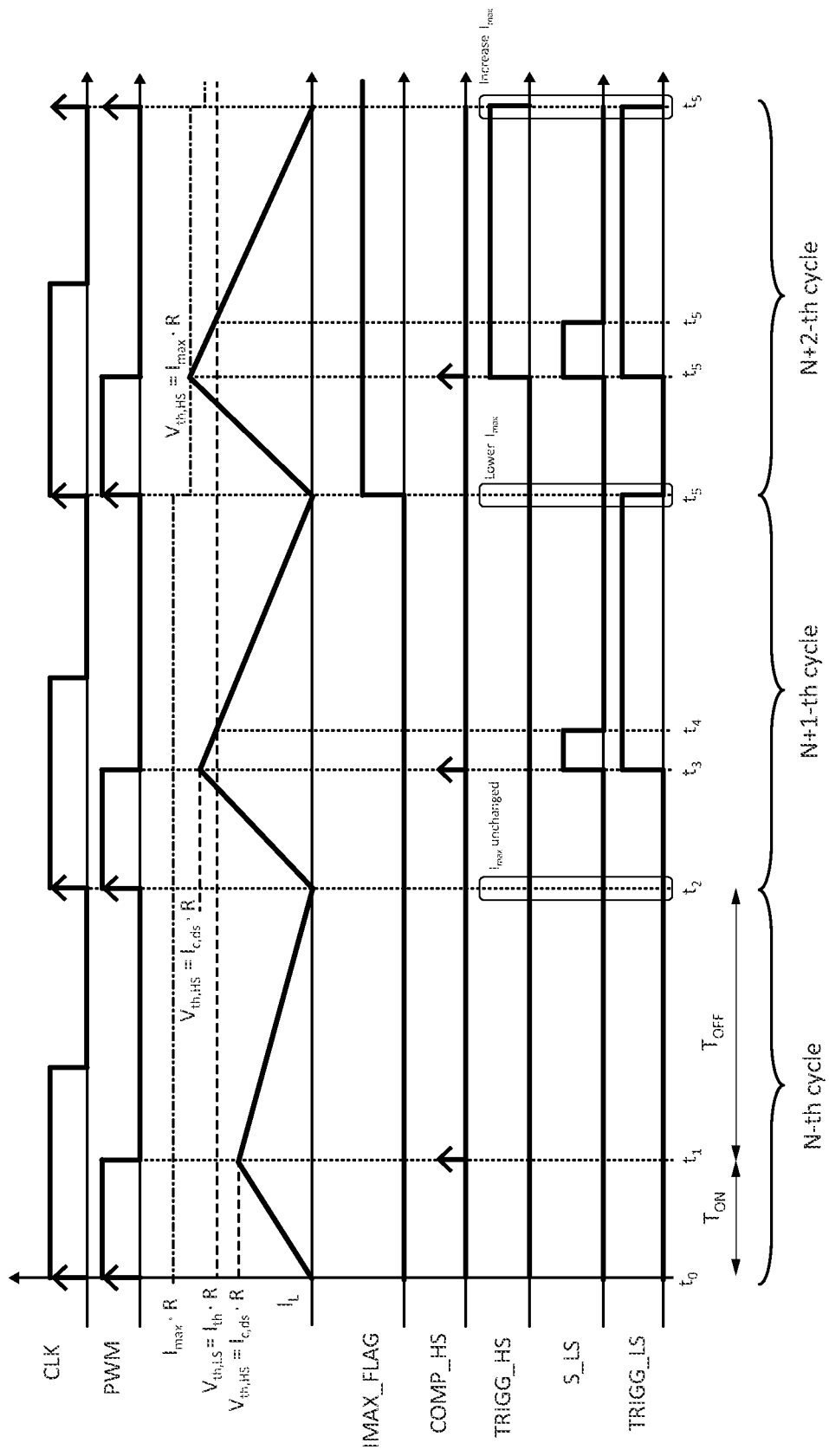
FIG. 7 shows a further example of waveforms of the voltage regulator of FIG. 4, in use.

In detail, as shown in FIGS. 6 and 7, in each cycle of the modulated signal PWM, the modulated signal PWM has a first semi-period of duration $T_{ON}$ and a second semi-period of duration $T_{OFF}$, such that $T=T_{ON}+T_{OFF}$. The first semi-period and the second semi-period of the modulated signal PWM define an ON-phase and, respectively, an OFF-phase of the regulator 50.

The modulated signal PWM has, in the ON-phase, a first value, here a high logic value '1', and, in the OFF-phase, a second value, here a low logic value '0'. The control logic circuit 96 provides the switch control signals T1, T2, T3, T4, in a per se known manner, from the modulated signal PWM.

Again, with reference to FIG. 4, the high-side current detector 94 comprises a comparator 98 coupled at input between the intermediate node 85 of the second half-bridge 65 and the output node 54, and a controlled voltage generator 100, which determines a trigger threshold, hereinafter high-side threshold voltage $V_{th,HS}$, of the comparator 98. The trigger threshold of the comparator 98 is controlled by the loop control current $I_{c,ds}$. The comparator 98 has a first input coupled to a conduction terminal of the second high-side switch 82, here coinciding with the output node 54, and a second input 99, and provides the high-side comparison signal COMP_HS at an output 104. The controlled voltage generator 100 is coupled between the intermediate node 85 of the second half-bridge 65 and the second input 99 of the comparator 98.

In this embodiment, the controlled voltage generator 100 is formed by a resistor 102 of resistance R coupled between the intermediate node 85 of the second half-bridge 65 and the second input 99 of the comparator 98.

In use, the loop control current $I_{c,ds}$ flows into the second input 99 of the comparator 98 through the resistor 102. The high-side threshold voltage $V_{th,HS}$ drops on the resistor 102 and is given by $V_{th,HS}=I_{c,ds}\cdot R$. The loop control current $I_{c,ds}$ may be much lower than the current $I_L$ flowing, in use, through the inductor 87, and the resistance R of the resistor 102 may be much higher than the switch resistance $R_{ds}$. For example, the loop control current $I_{c,ds}$ may be of the order of a few micro-Amperes; the inductor current $I_L$ may be of the order of a few Amperes; the resistance R of the resistor 102 may be of the order of a few kilo-Ohms; and the switch resistance $R_{ds}$ may be of the order of a few milli-Ohms.

The high-side threshold voltage $V_{th,HS}$ determines a high-side current threshold $I_{th,HS}$ of the high-side current detector 94. The high-side current threshold $I_{th,HS}$ is the value of the switch current $I_{ds}$ which triggers the comparator 98 and is equal, as a first approximation, to $I_{c,ds}\cdot R/R_{ds}$.

The low-side current detector 95 comprises a comparator 107 coupled at input between the ground 78 and the common node 72, and a controlled voltage generator 11o, which determines a trigger threshold, hereinafter low-side threshold voltage $V_{th,LS}$, of the comparator 107. The comparator 107 has a first input coupled to a terminal of the shunt resistor 80, here to the ground 78, and a second input 108, and provides at output the low-side comparison signal COMP_LS. The controlled voltage generator 110 is coupled between the common node 72 of the switching circuit 53 and the second input 108 of the comparator 107. The controlled voltage generator 110 is formed, in this embodiment, by a resistor 112 having resistance R and coupled between the common node 72 and the second input 108 of the comparator 107, and by a current generator 113 providing an inner threshold current $I_{th}$ to the second input 108 of the comparator 107.

The inner threshold current $I_{th}$ indicates a maximum value of current flowable in the switching circuit 53, in particular through the inductor 87; for example, it indicates a desired value of the maximum current flowable in the switching circuit 53, which may be chosen by a user according to the specific application. In this embodiment, the inner threshold current $I_{th}$ is a constant current. However, the inner threshold current $I_{th}$ may be variable, for example modifiable, in use, according to the specific application. For example, the inner threshold current $I_{th}$ may be much lower than the maximum value of current that is desired to flow in the switching circuit 53, and the resistance R of the resistor 112 may be much greater than the shunt resistance $R_S$. For example, the inner threshold current $I_{th}$ may be of the order of a few micro-Amperes; the desired value of the maximum current flowable in the switching circuit 53 may be of the order of a few Amperes; the resistance R of the resistor 112 may be of the order of a few kilo-Ohms; and the shunt resistance $R_S$ may be of the order of a few milli-Ohms.

In practice, the low-side threshold voltage $V_{th,LS}$ is the voltage dropping, in use, on the resistor 112 and associated with the inner threshold current Ith; i.e., $V_{th,LS}=$Ith$\cdot$R. The low-side threshold voltage $V_{th,LS}$ determines a low-side current threshold $I_{th,LS}$ of the low-side current detector 95. The low-side current threshold $I_{th,LS}$ is the value of the shunt current $I_{RS}$ which triggers the comparator 107 and is equal, as a first approximation, to $I_{th}\cdot R/R_S$.

The feedback circuit 92 comprises a compensation module 116, coupled to the output node 54 and to the reference node 52 and providing a control voltage $V_c$ as a function of the error signal $V_E$, and a voltage-to-current conversion module 118, receiving the calibration signal CAL and the control voltage $V_c$ and providing the loop control current $I_{c,ds}$. In detail, the compensation module 116 comprises an error amplifier, here an operational transconductance amplifier (OTA) 120 having an output 121, and a compensation network 122 coupled to the output 121. In this embodiment, the compensation module 116 further comprises a voltage divider 123 coupled between the output node 54 and the ground 78. In detail, the voltage divider 123 has an intermediate node 124 and is formed by a series circuit having here two resistors 125 mutually coupled to the intermediate node 124.

The OTA 120 has a first input coupled to the reference node 52 and a second input coupled to the intermediate node 124 of the voltage divider 123. In practice, in this embodiment, the OTA 120 compares the reference voltage $V_{ref}$ with a fraction of the output voltage $V_{out}$, according to the resistance values of the resistors 125.

In this embodiment, the compensation network 122 is of the first order and comprises a series circuit formed by a compensation resistor 126 and a compensation capacitor 128 and coupled between the output node 121 of the OTA 120 and the ground 78. However, the compensation network 122 may be formed by electrical elements different in number and type, according to the specific transfer function desired for the compensation module 116, i.e. to the trend of the control voltage $V_c$ as a function of the error signal $V_E$. For example, the compensation network 122 may be of an order other than the first, for example it may be of the second order or of the third order.

The voltage-to-current conversion module 118 is formed by a voltage-controlled current generator 130, which receives the control voltage $V_c$ and provides an intermediate control current $I_c$ as a function of the control voltage $V_c$ and a current mirror 131, which provides the loop control current $I_{c,ds}$ as a function of the intermediate control current $I_c$.

The voltage-controlled current generator 130 comprises a first series circuit having a transistor 145A, here a NMOS, controlled by the control voltage $V_c$ and a second series circuit having a node 140 through which the intermediate control current $I_c$ flows. In detail, in this embodiment, the first series circuit also comprises a transistor 145B, here a P-MOS having the gate and drain terminals connected to each other, and a resistor 145C coupled to the ground 78. The second series circuit comprises two transistors 146A, 146B mutually coupled to the node 140. The transistor 146A, here a PMOS, has the gate terminal connected to the gate terminal of the transistor 145B. The source terminal of the transistor 146A and the source terminal of the transistor 145B are mutually connected to each other and are connected to a node at a supply voltage Vcc.

The transistor 146B, here an NMOS, is coupled between the node 140 and the ground 78.

The current mirror 131 is a current-limited mirror comprising a limiting portion 133, coupled to the voltage-controlled current generator 130, and an output portion, here formed by a single transistor 135, providing the loop control current $I_{c,ds}$. The limiting portion 133 is capable of providing a maximum current $I_{max}$ and is configured to mirror, on the output portion 135, the intermediate control current $I_c$, if the intermediate control current $I_c$ is lower than the maximum current $I_{max}$, and the maximum current $I_{max}$, if the intermediate control current $I_c$ is greater than or equal to the maximum current $I_{max}$. The maximum current $I_{max}$ may be much lower than the maximum value of current flowable in the switching circuit 153, for example it may be of the order of a few micro-Amperes. In detail, the limiting portion 133 comprises a variable current generator 137, for example a DAC current generator, and a current mirror branch 139 mutually coupled in series at a node 138. The current mirror branch 139 is traversed, in use, by a mirrored current $I_m$ flowing between the node 138 and the ground 78.

The current mirror branch 139 is coupled to the node 140 of the voltage-controlled current generator 130. The voltage of the node 140 controls the mirrored current $I_m$ flowing in the current mirror branch 139. In detail, the current mirror branch 139 is formed by a series circuit comprising a transistor 147A, here an NMOS, having the gate terminal connected to the node 140, and a transistor 147B, here an NMOS, having the gate terminal connected to the drain terminal. The gate terminal of the transistors 135, 147B and 146B are connected to each other.

The calibration signal CAL controls the variable current generator 137, so as to tune the deliverable value of the maximum current $I_{max}$.

In this embodiment, the variable current generator 137 is formed by a fixed generator 141 coupled in parallel to one or more selectable generators, here three selectable generators 142A, 142B, 142C. The selectable generators 142A-142C are each formed by a respective series circuit comprising a fixed current generator 143 and a switch 144.

The calibration signal CAL is a digital signal which comprises, in this embodiment, three bits b0, b1, b2, each commanding the closing and opening of the switch 144 of a respective selectable generator 142A-142C. Therefore, the calibration signal CAL tunes the maximum current $I_{max}$ that the variable current generator 137 may provide to the node 138 by driving the opening and closing of the switches 144. In practice, in this embodiment, the maximum current $I_{max}$ may assume, in use, up to a maximum of eight different values, as a function of the maximum current deliverable by each generator 143 and of the number of the activated selectable generators 142A-142C. Furthermore, the limiting portion 131 comprises a maximum current detector, here a buffer 142, configured to sense when the mirrored current $I_m$ reaches the value of the maximum current $I_{max}$. In practice, the value of the maximum current $I_{max}$ is an alert value.

The buffer 142 has an input coupled to the node 138 and provides a maximum current sensing signal IMAX_FLAG at output according to whether the mirrored current $I_m$ is lower than or equal to the maximum current $I_{max}$. Alternatively, the maximum current sensing signal IMAX_FLAG may indicate, for example, whether the mirrored current $I_m$ is equal to the maximum current $I_{max}$ minus a threshold value, which may be chosen according to the specific application.

In this embodiment, the maximum current sensing signal IMAX_FLAG has a high logic value when the mirrored current $I_m$ reaches the value of the maximum current $I_{max}$, and a low logic value, when the mirrored current $I_m$ is lower than the maximum current $I_{max}$.

With reference to FIGS. 3 and 4, the control device 55 further comprises a calibration circuit or module 149, which receives and compares the low-side comparison signal COMP_LS with an alert signal, here formed by the maximum current sensing signal IMAX_FLAG and by the high-side comparison signal COMP_HS, and, in response, provides the calibration signal CAL. Furthermore, the calibration circuit 149 also receives the modulated signal PWM, so as to compare the low-side comparison signal COMP_LS with the high-side comparison signal and the maximum current sensing signal IMAX_FLAG within one cycle of the modulated signal PWM.

In practice, the calibration signal CAL may be modified or updated at each cycle of the modulated signal PWM, so as to modify the trigger threshold of the high-side current detector 94 and cause the trigger threshold of the high-side current detector 94 to become equal to the trigger threshold of the low-side current detector 95.

Figure 5:
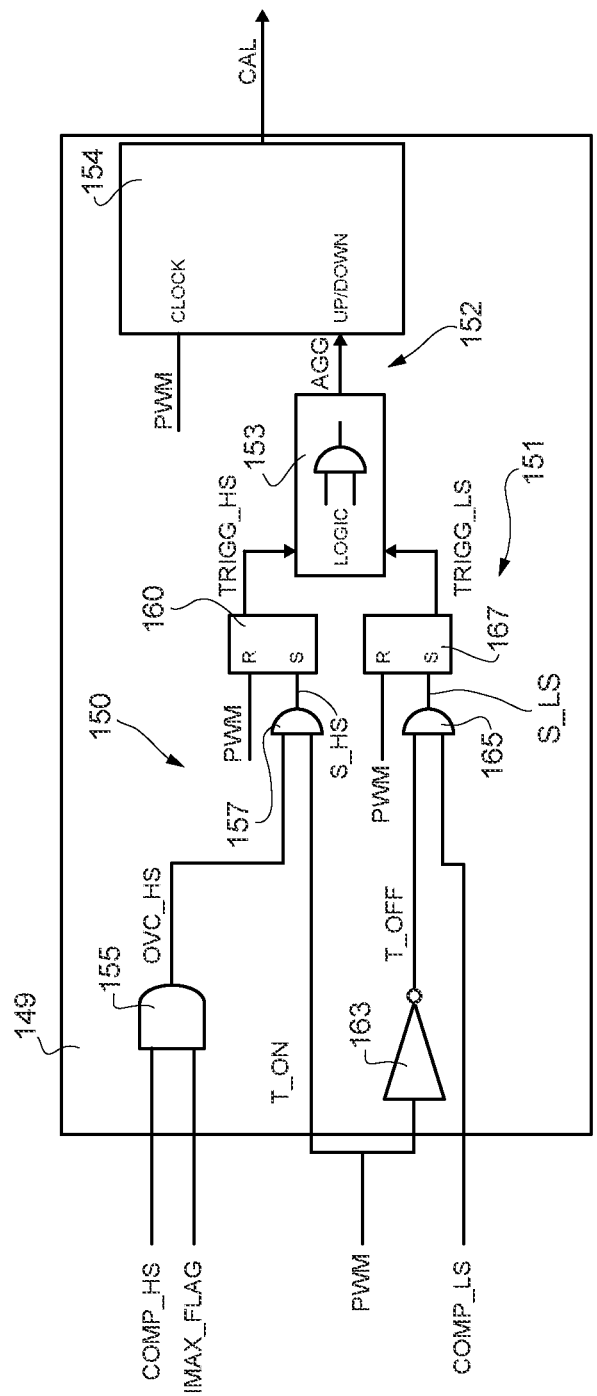
FIG. 5 shows a block diagram of a portion of the voltage regulator of FIG. 4.

With reference to FIG. 5, the calibration circuit 149 comprises a high-side comparison branch 150, which provides a high-side trigger signal TRIGG_HS as a function of the high-side comparison signal COMP_HS and of the maximum current sensing signal IMAX_FLAG; a low-side comparison branch 151, which provides a low-side trigger signal TRIGG_LS as a function of the low-side comparison signal COMP_LS; and an update logic 152, which compares the high-side trigger and low-side trigger signals TRIGG_HS, TRIGG_LS and, in response, provides the calibration signal CAL.

In detail, the high-side comparison branch 150 comprises a first AND logic gate 155, which receives the high-side comparison signal COMP_HS and the maximum current sensing signal IMAX_FLAG and provides a high-side overcurrent signal OVC_HS; a second AND logic gate 157, which receives the high-side overcurrent signal OVC_HS and the modulated signal PWM (here also indicated as ON-phase signal T_ON), and provides a signal S_HS; and a memory element 160, here sensitive to a rising edge at input, having a reset input R and a set input S, which receives the modulated signal PWM at the reset input R and the signal S_HS at the set input S, and provides the high-side trigger signal TRIGG_HS at output.

The low-side comparison branch 151 comprises an inverter 163, which receives the modulated signal PWM and provides an OFF-phase signal T_OFF; an AND logic gate 165, which receives the OFF-phase signal T_OFF and the low-side comparison signal COMP_LS and provides a signal S_LS; and a memory element 167, here sensitive to a rising edge at input, having a reset input R and a set input S, which receives the modulated signal PWM at the reset input R and the signal S_LS at the set input S, and provides the low-side trigger signal TRIGG_LS at output.

The update circuit 152 comprises a comparison logic 153, which compares the high-side trigger TRIGG_HS and the low-side trigger signals TRIGG_LS and, in response, provides an update signal AGG; and a counter 154, triggered by the modulated signal PWM, in particular here by a rising edge of the signal PWM, and configured to update the value of the calibration signal CAL as a function of the update signal AGG.

With reference to FIG. 4, in this embodiment, the value indicated by the calibration signal CAL indicates a value of the counter 154. In detail, the bits b0, b1, b2 of the calibration signal CAL indicate the value of the counter 154. Consequently, by updating the value of the counter 154, it is possible to modify the open/closed configuration of the switches 144 of the variable current generator 137 and, therefore, to modify the value of the maximum current $I_{max}$ that the limiting portion 133 may provide.

In use, at the beginning of an N-th cycle of the modulated signal PWM, i.e. here in response to an N-th rising edge of the modulated signal PWM, the high-side trigger TRIGG_HS and low-side trigger signals TRIGG_LS assume a reset value, here the low logic value.

At the end of the N-th cycle, i.e. here at an N+1-th rising edge of the modulated signal PWM, the high-side trigger signal TRIGG_HS has the reset value if, during the ON-phase of the N-th cycle, at least one of the high-side comparison signal COMP_HS and the maximum current sensing signal IMAX_FLAG has not assumed the high logic value. Conversely, at the end of the N-th cycle, the high-side trigger signal TRIGG_HS has the high logic value if, during the ON-phase of the N-th cycle, both the high-side comparison signal COMP_HS and the maximum current sensing signal IMAX_FLAG have assumed the high logic value. In other words, at the end of the N-th cycle, the high-side trigger signal has the low logic value if, during the ON-phase of the N-th cycle, the mirrored current $I_m$ has been lower than the maximum current $I_{max}$, while it has the high logic value if, during the ON-phase of the N-th cycle, the mirrored current $I_m$ has reached the value of the maximum current $I_{max}$.

Furthermore, at the end of the N-th cycle, the low-side trigger signal TRIGG_LS has the reset value if, during the OFF-phase of the N-th cycle, the low-side comparison signal COMP_LS has not assumed the high logic value. Conversely, at the end of the N-th cycle, the low-side trigger signal TRIGG_LS has the high logic value if, during the OFF-phase of the N-th cycle, the low-side comparison signal COMP_LS has assumed the high logic value. In other words, at the end of the N-th cycle, the low-side trigger signal TRIGG_LS has the low logic value if, during the OFF-phase of the N-th cycle, the shunt current $I_{RS}$ has been lower than the low-side threshold current $I_{th,LS}$ of the low-side current detector 95.

In detail, the update circuit 152, at each cycle of the modulated signal PWM, for example in response to a rising edge of the modulated signal PWM:

leaves the value indicated by the calibration signal CAL unchanged, if the high-side trigger signal TRIGG_HS and the low-side trigger signal TRIGG_LS have the low logic value;

lowers, for example by one unit, the value indicated by the calibration signal CAL, if the high-side trigger signal TRIGG_HS has the low logic value and the low-side trigger signal TRIGG_LS has the high logic value;

increases, for example by one unit, the value indicated by the calibration signal CAL, if the high-side trigger signal TRIGG_HS has the high logic value and the low-side trigger signal TRIGG_LS has the low logic value; and lowers, for example by one unit, the value indicated by the calibration signal CAL, if the high-side trigger signal TRIGG_HS and the low-side trigger signal TRIGG_LS have the high logic value.

In practice, at the end of an N-th cycle of the modulated signal PWM, the update circuit 152: lowers the value of the maximum current Imax, if the low-side current detector 95 has sensed a shunt current $I_{RS}$ greater than the low-side threshold current $I_{th,LS}$ during the N-th cycle; increases the value of the maximum current Imax, if the mirrored current $I_m$ is equal to the maximum current $I_{max}$ and the low-side current detector 95 has sensed a shunt current $I_{RS}$ lower than the low-side threshold current $I_{th,LS}$, during the N-th cycle; and leaves the value of the maximum current $I_{max}$ unchanged, if, during the N-th cycle, the mirrored current $I_m$ is lower than the maximum current $I_{max}$ and the low-side current detector 95 has sensed a shunt current $I_{RS}$ lower than the low-side threshold current $I_{th,LS}$.

In practice, the high-side threshold voltage $V_{th,HS}$ is a function of the calibration signal CAL.

In use, the control device 55 modifies the duty cycle of each cycle (or period) of the modulated signal PWM, so that the output voltage $V_{out}$ becomes equal to the reference voltage $V_{ref}$.

In buck mode, the control logic circuit 96 provides the switch control signals T1, T2, T3 and T4 so that, in the ON-phase of the regulator 50 (here when the modulated signal PWM has the high logic value), the first high-side switch 68 and the second high-side switch 82 are closed and the first low-side switch 69 and the second low-side switch 83 are open; and, in the OFF-phase of the regulator 50 (here when the modulated signal PWM has the low logic value), the first high-side switch 68 and the second low-side switch 83 are open and the first low-side switch 69 and the second high-side switch 82 are closed.

In practice, during the ON-phase of the modulated signal PWM, the inductor current $I_L$ flowing through the inductor 87 follows a current path $I_{ON}$, indicated by a dashed arrow in FIG. 4, from the input node 51 to the output node 54. During the OFF-phase of the modulated signal PWM, the inductor current $I_L$ flowing through the inductor 87 follows a current path $I_{OFF}$, indicated by a dash-dot arrow in FIG. 4, from the ground 78 to the output node 54. In practice, in the ON-phase, the current flows in the high-side 88 of the switching circuit 53 and does not flow through the shunt resistor 80; in the OFF-phase, the current also flows in the low-side 89 of the switching circuit 53, through the shunt resistor 80. During the ON-phase, the loop control current $I_{c,ds}$ flows from the intermediate node 85 of the switching circuit 53 through the resistor 102 of the high-side current detector 94 and through the output portion 135 of the current mirror 131. As previously described, the high-side threshold voltage $V_{th,HS} = I_{c,ds} \cdot R$ drops on the resistor 102.

Again, with reference to the ON-phase, the switch current $I_{ds}$ flows through the second high-side switch 82 towards the output node 54. The second high-side switch 82 has, when closed (i.e., in the on-state), an on-state resistance $R_{ds}$. A switch voltage $V_{ds}$ drops on the second high-side switch 82; the switch voltage $V_{ds}$ is given by $V_{ds} = I_{ds} \cdot R_{ds}$.

In practice, during the ON-phase, the inductor current $I_L$ is given by $I_L = I_{c,ds} + I_{ds}$. However, the loop control current $I_{c,ds}$ may be much lower than the switch current Ids; for example, the switch current Ids may be of the order of a few Amperes, while the loop control current $I_{c,ds}$ may be of the order of a few micro-Amperes. Consequently, as a first approximation, the inductor current $I_L$ is equal to the switch current $I_{ds}$.

During the OFF-phase, the shunt current $I_{RS}$ flows from the ground 78 through the shunt resistor 80, towards the common node 72 of the switching circuit 53. A shunt voltage $V_{RS}$ drops on the shunt resistor 80; the shunt voltage $V_{RS}$ is given by $V_{RS} = I_{RS} \cdot R_S$.

The inner threshold current $I_{th}$ flows through the resistor 112 of the low-side current detector 95. The low-side threshold voltage $V_{th,LS}$ drops on the resistor 112; the low-side threshold voltage $V_{th,LS}$ is given by $V_{th,LS} = I_{th} \cdot R$. In practice, during the OFF-phase, the inductor current $I_L$ is given by $I_L = I_{RS} - I_{th}$. However, the inner threshold current $I_{th}$ may be much lower than the shunt current $I_{RS}$; for example, the shunt current $I_{RS}$ may be of the order of a few Amperes, while the inner threshold current $I_{th}$ may be of the order of a few micro-Amperes. Consequently, as a first approximation, the inductor current $I_L$ is equal to the shunt current $I_{RS}$.

The comparator 98 of the high-side current detector 94 switches the high-side comparison signal COMP_HS as a function of the difference between the switch voltage $V_{ds}$ and the high-side threshold voltage $V_{th,HS}$. In detail, in this embodiment, the comparator 98 switches the high-side comparison signal COMP_HS to the high logic value when it senses that the switch voltage $V_{ds}$, while increasing, reaches or becomes greater than the high-side threshold voltage $V_{th,HS}$. Conversely, the comparator 98 switches the high-side comparison signal COMP_HS to the low logic value when it senses that the switch voltage $V_{ds}$, while decreasing, reaches or becomes lower than the high-side threshold voltage $V_{th,HS}$.

In practice, the high-side detector 94 senses whether the switch current $I_{ds}$ is greater than the high-side current threshold $I_{th,HS} = V_{th,HS}/R_{ds} = I_{c,ds} \cdot R/R_{ds}$.

The comparator 107 of the low-side current detector 95 switches the low-side comparison signal COMP_LS as a function of the difference between the shunt voltage $V_{RS}$ and the low-side threshold voltage $V_{th,LS}$. In detail, in this embodiment, the comparator 107 switches the low-side comparison signal COMP_LS to the high logic value when it senses that the shunt voltage $V_{RS}$, while increasing, reaches or becomes greater than the low-side threshold voltage $V_{th,LS}$. Conversely, the comparator 107 switches the low-side comparison signal COMP_LS to the low logic value when it senses that the shunt voltage $V_{RS}$, while decreasing, reaches or becomes lower than the low-side threshold voltage $V_{th,LS}$.

In practice, the low-side detector 95 senses whether the shunt current $I_{RS}$ is greater than the low-side current threshold $I_{th,LS} = V_{th,LS}/R_S = I_{th} \cdot R/R_S$.

FIG. 6 shows an example of waveforms of the regulator 50, in use, in an N-th cycle and a subsequent N+1-th cycle of the modulated signal PWM, when the regulator 50 is in buck mode.

In the example of FIG. 6, during the N-th cycle, the maximum current sensing signal IMAX_FLAG has the high logic value; i.e., the loop control current $I_{c,ds}$ is equal to the maximum current $I_{max}$. Consequently, the high-side threshold voltage $V_{th,HS}$ is equal to $I_{max} \cdot R$ and the high-side current threshold $I_{th,HS}$ is equal to $R/R_{ds} \cdot I_{max}$; i.e. corresponding to an alert value.

At the beginning of the N-th cycle (instant to), the regulator 50 enters the ON-phase. During the ON-phase, the inductor current $I_L$ increases as the time increases. The inductor current $I_L$ may follow a substantially linear trend, which is a function of the inductance L and of the difference between the output voltage $V_{out}$ and the input voltage $V_{in}$. Consequently, the switch current $I_{ds}$ flowing through the second high-side switch 82 increases. Hence, the switch voltage $V_{ds}$ also increases during the ON-phase.

At instant $t_1$, the high-side current detector 94 senses that the switch voltage Vas reaches the high-side threshold voltage $V_{th,HS}$. Consequently, the comparator 98 switches the high-side comparison signal COMP_HS to the high value. In response, the control logic circuit 96 switches the modulated signal PWM to the low value; then the OFF-phase begins at instant $t_1$.

In practice, the control device 55 operates, in buck mode, a peak current control.

Furthermore, the high-side trigger signal TRIGG_HS has the low logic value from instant t0 to instant $t_1$. At instant $t_1$, when the high-side comparison signal COMP_HS switches to the high value, also the high-side trigger signal TRIGG_HS switches to the high value, since, in the example shown, the maximum current sensing signal IMAX_FLAG has the high value.

As a first approximation, the inductor current $I_L(t_1^-)$ flowing through the inductor 87 at the end of the ON-phase (instant $t_1^-$) is equal to the inductor current $I_L(t_1^+)$ flowing through the inductor 87 at the beginning of the OFF-phase (instant $t_1^+$).

In the example shown in FIG. 6, at instant $t_1$, the low-side current detector 95 senses that the shunt voltage $V_{RS}$ is greater than the low-side threshold voltage $V_{th,LS}$. Furthermore, from instant $t_1$, the modulated signal PWM is in the OFF-semi-period; consequently, the signal S_LS switches to the high value at instant $t_1$.

During the OFF-phase, the inductor current $I_L$ decreases.

At instant $t_2$, the shunt voltage $V_{RS}$ becomes equal to the low-side threshold voltage $V_{th,LS}$ and, for $t > t_2$, the low-side current detector 95 senses that the shunt voltage $V_{RS}$ is lower than the low-side threshold voltage $V_{th,LS}$. Consequently, at instant $t_2$, the signal S_LS at output of the AND logic gate 157 switches to the low value.

The low-side trigger signal TRIGG_LS has the low value from instant $t_0$ to instant $t_1$. At instant $t_1$, in response to the switching of the signal S_LS, the low-side trigger signal TRIGG_LS also switches to the high value.

Furthermore, the memory element 167 maintains the low-side trigger signal TRIGG_LS on the high value throughout the duration of the OFF-phase, even for $t>t_2$.

At the end of the N-th cycle, instant $t_3$, the high-side trigger signal TRIGG_HS and the low-side trigger signal TRIGG_LS have, in the example of FIG. 6, the high value. Consequently, the update circuit 152 updates the calibration signal CAL so as to cause a lowering of the maximum current $I_{max}$ deliverable by the voltage-to-current conversion module 118 in the subsequent N+1-th cycle. For example, with reference to the embodiment shown in FIG. 4, the calibration signal CAL may be updated so as to cause the opening of the switch 144 of one of the selectable generators 142A-142C, thus lowering the maximum value of the deliverable current by the variable current generator 137.

In practice, the maximum value of the loop control current $I_{c,ds}$ that the feedback circuit 92 is capable of providing in the N+1-th cycle is lower than the maximum value of the loop control current $I_{c,ds}$ that the feedback circuit 92 is capable of providing in the N-th cycle.

In the example of FIG. 6, the maximum current sensing signal IMAX_FLAG has the high value even during the N+1-th cycle. Consequently, even in the N+1-th cycle, the loop control current $I_{c,ds}$ is equal to the maximum current $I_{max}$ and therefore the high-side threshold voltage $V_{th,HS}$ is given by $I_{max} \cdot R$. However, in the N+1-th cycle, the maximum current $I_{max}$ deliverable by the voltage-to-current conversion module 118 is lower than the maximum current $I_{max}$ deliverable by the voltage-to-current conversion module 118 during the N-th cycle. Therefore, in the N+1-th cycle, the high-side threshold voltage $V_{th,HS}$ used by the high-side current detector 94 (instant $t_4$) is lower than the high-side threshold voltage $V_{th,HS}$ used by the high-side current detector 94 in the N-th cycle (instant $t_1$).

Furthermore, in the example shown in FIG. 6, the high-side threshold voltage $V_{th,HS}$ of the N+1-th cycle is lower than the low-side threshold voltage $V_{th,LS}$. Thus, in the N+1-th cycle, the signal S_LS and the low-side trigger signal TRIGG_LS do not switch to the high value and maintain the low value throughout the N+1-th cycle. Consequently, at the end of the N+1-th cycle (instant $t_5$), the low-side trigger signal TRIGG_LS has the low value.

Conversely, at the end of the N+1-th cycle, the high-side trigger signal TRIGG_HS has the high value.

Then, at instant $t_5$, the update circuit 152 updates the calibration signal CAL so as to increase the maximum current $I_{max}$ deliverable by the voltage-to-current conversion module 118 in a subsequent N+2-th cycle (not shown here).

FIG. 7 shows a further example of waveforms of the control device 55 of FIG. 4, in use, in buck mode. More specifically, FIG. 7 shows three subsequent cycles N, N+1 and N+2 of the modulated signal PWM.

In the example of FIG. 7, during the N-th cycle, the maximum current sensing signal IMAX_FLAG has the low value. Therefore, the loop control current $I_{c,ds}$, in the N-th cycle, is lower than the value of the maximum current $I_{max}$. For example, the maximum current $I_{max}$ that the voltage-to-current conversion module 118 may deliver in the N-th cycle has been set to the current value in a previous cycle, not shown here, by the calibration signal CAL.

In the N-th cycle, the high-side threshold voltage $V_{th,HS}$ is therefore equal to $I_{c,ds} \cdot R$. Furthermore, in the example of FIG. 7, the high-side threshold voltage $V_{th,HS}$ of the N-th cycle is lower than the low-side threshold voltage $V_{th,LS}$. In the N-th cycle, the ON-phase extends between instant to and instant $t_1$, wherein the high-side current detector 94 senses that the switch voltage $V_{ds}$ associated with the switch current $I_{ds}$ reaches the high-side threshold voltage $V_{th,HS}$. The OFF-phase extends between instant $t_1$ and instant $t_2$.

At the end of the N-th cycle (instant $t_2$), the high-side trigger signal TRIGG_HS has the low value, since the maximum current sensing signal IMAX_FLAG has had, in the N-th cycle, the low value. At instant $t_2$, the low-side trigger signal TRIGG_LS also has the low value, since the shunt voltage $V_{RS}$ associated with the shunt current $I_{RS}$ has been lower than the low-side threshold voltage $V_{th,LS}$ during the N-th cycle. Consequently, the update circuit 152 leaves the value of maximum current $I_{max}$, indicated by the calibration signal CAL, unchanged.

Consequently, the maximum current $I_{max}$ that the voltage-to-current conversion module 118 may provide in the N+1-th cycle is equal to the maximum current $I_{max}$ that the voltage-to-current conversion module 118 could provide in the N-th cycle.

In the example of FIG. 7, the maximum current sensing signal IMAX_FLAG has the low value even during the N+1-th cycle. However, the loop control current $I_{c,ds}$ provided by the voltage-to-current conversion module 118 during the N+1-th cycle is greater than the loop control current $I_{c,ds}$ provided during the N-th cycle. Consequently, the high-side threshold voltage $V_{th,HS}$ of the N+1-th cycle is greater than the high-side threshold voltage $V_{th,HS}$ of the N-th cycle. For example, between the N-th cycle and the N+1-th cycle, the difference between the output voltage $V_{out}$ and the reference voltage $V_{ref}$ is increased, causing an increase in the control voltage $V_c$ and in the intermediate control current $I_c$.

Furthermore, in the N+1-th cycle of the example in FIG. 7, the high-side threshold voltage $V_{th,HS}$ is greater than the low-side threshold voltage $V_{th,LS}$. Thus, in the N+1-th cycle, when the high-side current detector 94 triggers (instant t), the low-side current detector 95 also triggers. Therefore, the low-side trigger signal TRIGG_LS has the high value from instant $t_3$ to instant $t_4$, wherein the shunt voltage $V_{RS}$ associated with the shunt current $I_{RS}$ falls below the low-side trigger threshold $V_{th,LS}$.

At the end of the N+1-th cycle (instant $t_5$) the high-side trigger signal TRIGG_HS has the low value and the low-side trigger signal TRIGG_LS has the high value; therefore, the update circuit 152 updates the calibration signal CAL so as to cause a lowering of the maximum current $I_{max}$ that the voltage-to-current conversion module 118 may provide.

In the example of FIG. 7, in response to the lowering of the maximum current $I_{max}$ at the end of the N+1-th cycle, the maximum current sensing signal IMAX_FLAG switches to the high value. Therefore, from instant $t_5$, the loop control current $I_{c,ds}$ becomes equal to the maximum current $I_{max}$.

In the N+2-th cycle, the high-side trigger threshold $V_{th,HS}$ used by the high-side current detector 94 (instant $t_6$) is therefore a function of the maximum current $I_{max}$ set by the calibration signal CAL at the end of the N+1-th cycle. Furthermore, in the N+2-th cycle, the high-side trigger threshold $V_{th,HS}$ is greater than the low-side trigger threshold $V_{th,LS}$.

At the end of the N+2-th cycle (instant $t_8$), both the high-side trigger signal TRIGG_HS and the low-side trigger signal TRIGG_LS have the high value. Then, the update circuit 152 updates the calibration signal CAL so as to lower the maximum current $I_{max}$ that the voltage-to-current conversion module 118 may provide in a subsequent N+3-th cycle, not shown here.

In practice, the calibration logic circuit 149 modifies the calibration signal CAL in such a way that the high-side current threshold $I_{th,HS}$ tends to be equal to the low-side current threshold $I_{th,LS}$. The calibration circuit 149 allows the low-side current detector 95 to be used to correct sensing inaccuracies of the high-side current detector 94.

In fact, the resistance $R_S$ of the shunt resistor 80, which the low-side current detector 95 uses as the low-side current sensing element 89, may have a high stability over time. Conversely, the switch resistance $R_{ds}$ of the second high-side switch 82, which the high-side current detector 94 uses as the high-side current sensing element 88, may be subject to high variability. For example, the switch resistance $R_{ds}$ may have a high process variability and may have a strong dependence on temperature, which might compromise the sensing accuracy of the high-side current detector 94. Therefore, by modifying the trigger threshold of the high-side current detector 94, the control device 55 allows an accurate measurement of the current flowing in the high side 88 of the switching circuit 53 to be obtained, even in the presence of variations of the switch resistance $R_S$, when using the regulator 50.

In practice, the control device 55 allows a peak current control of the switching circuit 53 to be obtained in buck mode.

The fact that the shunt resistor 80 is arranged in the low side 89 of the switching circuit 53 allows a high efficiency, a low energy consumption and a low area occupation of the regulator 50 to be obtained.

Furthermore, the fact that the control device 55 uses the shunt resistor 80 and the second high-side switch 82 to sense the low-side current 89 and, respectively, the high-side current 88, allows overall a low energy consumption of the regulator 50 to be obtained, for example with respect to the known regulator 30 of FIG. 2 wherein two shunt resistors are used. Furthermore, the possibility of modifying the trigger threshold of the high-side current detector 94 allows the design of the same high-side current detector 94, in particular of the respective comparator 98, to be simplified. In addition, the fact that the calibration circuit 149 may update the value of the maximum current $I_{max}$ at each cycle of the modulated signal PWM allows to control accurately, cycle-by-cycle, the current flowing in the switching circuit 53.

The regulator 50 has a high use reliability and may also be used in applications where high safety requirements are required, for example in the automotive field. While not described in detail herein, the regulator 50 may also operate in boost and buck-boost mode. In this regard, with reference to FIG. 3 and as indicated by a dashed line, the control device 55 may also comprise a mode determination module 180 receiving the input voltage $V_{in}$ and the output voltage $V_{out}$ (or the input voltage $V_{in}$ and the reference voltage $V_{ref}$) and provide in response a mode signal MOD.

The mode signal MOD indicates whether the regulator is in buck, boost, or buck-boost mode. In this case, the control logic circuit 96 and the feedback circuit 92 may receive the mode signal MOD. If the mode signal MOD indicates that the regulator is in buck mode, the regulator 50 may operate, in use, as described above with reference to FIGS. 4-7.

If the mode signal MOD indicates that the regulator 50 is in the boost or buck-boost mode, then the feedback circuit 92 may provide a control current $I_{c,RS}$ to the low-side current detector 95, by modifying the trigger threshold thereof, for example as described with reference to FIG. 9.

Figure 8:
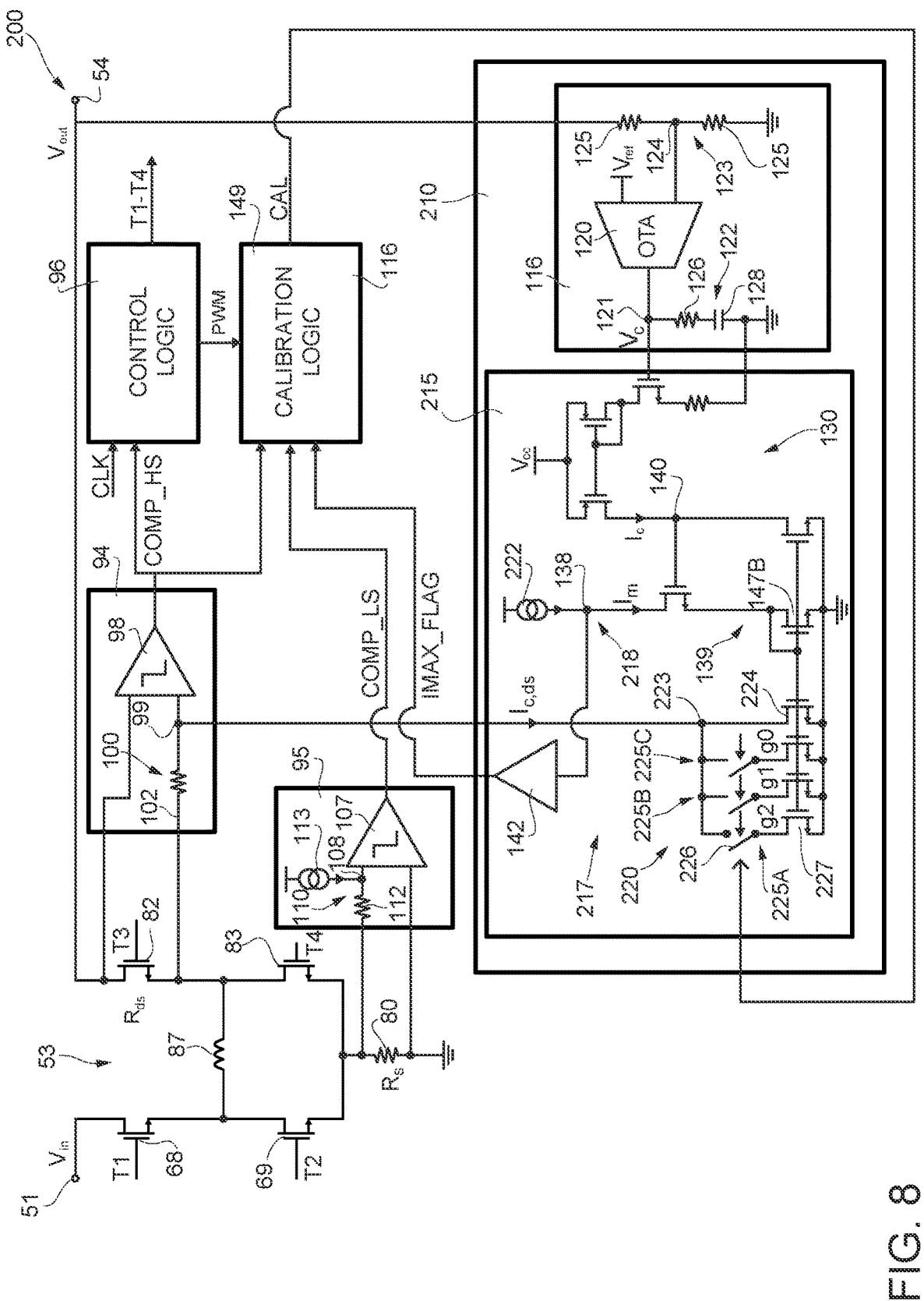
FIG. 8 shows a circuit diagram of the present voltage regulator, according to a different embodiment.

FIG. 8 shows a different embodiment of the control device, here indicated by 200, of the switching circuit 53. The control device 200 has a general structure similar to the control device 55 of FIGS. 2 and 3; consequently, elements in common are indicated by the same reference numbers and are not further described.

The control device 200 is also described with respect to the buck mode of the regulator 50. However, it will be clear to the person skilled in the art that the control device 200 may also be used in boost and buck-boost modes. The control device 200 comprises the high-side current detector 94, the low-side current detector 95, the control logic circuit 96, the calibration circuit 149 and a feedback circuit, here indicated by 210.

The feedback circuit 210 comprises the compensation module 116 that provides the control voltage $V_c$ as a function of the error signal $V_E$, and a voltage-to-current conversion module, here indicated by 215, which provides the loop control current $I_{c,ds}$ as a function of the calibration signal CAL and of the control voltage $V_c$.

In detail, in this embodiment, the voltage-to-current conversion module 215 comprises the voltage-controlled current generator 130 and a current mirror, here indicated by 217. The current mirror 217 is a current-limited mirror comprising a limiting portion, here indicated by 218, and an output portion, here indicated by 220, having a variable current gain. The variable current gain is a function of the calibration signal CAL.

In this embodiment, the limiting portion 218 comprises a current generator 222 capable of providing the node 138 with a current lower than or equal to a fixed maximum current $I_{max}$, and the current mirror branch 139.

The output portion 220 generates, as loop control current $I_{c,ds}$, the mirrored current $I_m$ modified by the variable current gain. In detail, the output portion 220 is coupled between a node 223, connected to the second input 99 of the comparator 98, and the ground 78 and is formed by a parallel circuit comprising a fixed transistor 224 and a plurality of selectable transistors, here three selectable transistors 225A, 225B, 225C. The selectable transistors 225A-225C are each formed by a respective series circuit comprising a switch 226 and a transistor 227. The gate terminals of the transistors 224, 227 are connected to the gate terminal of the transistor 147B.

In this embodiment, the calibration signal CAL is a digital signal comprising three bits g0, g1, g2 each commanding the closing and opening of the switch 226 of a respective selectable transistor 225A-225C. Also, in this embodiment, the limiting portion 217 comprises the buffer 142.

In use, the calibration circuit 149 updates the calibration signal CAL in a manner similar to what has been discussed for the control device 55 of FIG. 4.

In practice, in this embodiment, the maximum current $I_{max}$ that the voltage-to-current conversion module 215 may provide as loop control current $I_{c,ds}$, in each cycle of the modulated signal PWM, is modified by the calibration signal CAL by modifying the variable current gain of the output portion 220.

In practice, the output portion 220 operates as a variable current generator whose maximum value is controlled by the calibration signal CAL.

Furthermore, the variable current gain of the output portion 220 determines the ratio between the loop control current $I_{c,ds}$ and the mirrored current $I_m$ even when the mirrored current $I_m$ is lower than the maximum current $I_{max}$.

In practice, also in this embodiment, the high-side threshold voltage $V_{th,HS}$ is a function of the calibration signal CAL.

In practice, in use, by modifying the variable current gain of the output portion 220, the loop gain provided by the feedback circuit 210 is also modified. In detail, the Applicant has verified that the feedback circuit 210 allows the dependence of the loop gain on variations of the switch resistance $R_{ds}$ to be eliminated, as a first approximation. Consequently, the control device 200 allows the dependence of the performances of the regulator 50 on variations of the switch resistance $R_{ds}$ to be eliminated, as a first approximation.

Figure 9:
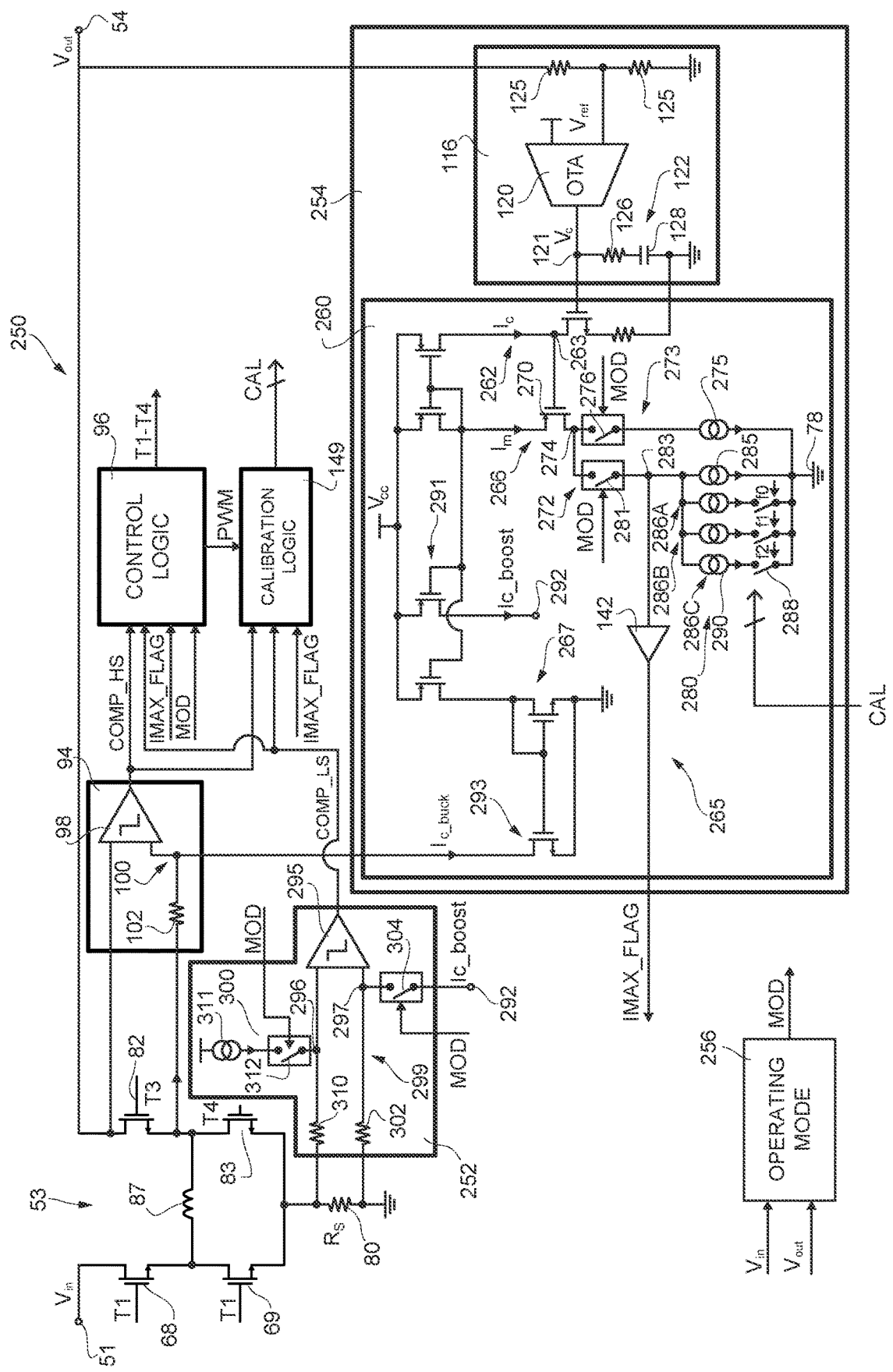
FIG. 9 shows a circuit diagram of the present voltage regulator, according to a further embodiment.

FIG. 9 shows a further embodiment of the present control device, here indicated by 250. The control device 250 has a general structure similar to the control device 55 of FIG. 4; consequently, elements in common are indicated by the same reference numbers and are not further described in detail. The control device 250 comprises the high-side current detector 94, a low-side current detector 252, the control logic circuit 96, the calibration circuit 149 and a feedback circuit 254. The control device 250 is configured to operate in buck, boost and buck-boost use modes, depending on the ratio between the output voltage $V_{out}$ (or the reference voltage $V_{ref}$) and the input voltage $V_{in}$. The control device 250 comprises a mode determination module 256 receiving the input voltage $V_{in}$, the output voltage $V_{out}$ and providing a mode signal MOD indicative of the use mode of the regulator 50.

The mode determination module 256 compares the input voltage $V_{in}$ and the output voltage $V_{out}$. The mode signal MOD indicates the buck mode if the input voltage $V_{in}$ is greater than the output voltage $V_{out}$, the boost mode if the input voltage $V_{in}$ is lower than the output voltage $V_{out}$, and the buck-boost mode if the input voltage $V_{in}$ is approximately equal to the output voltage $V_{out}$. For example, the mode determination module 256 may indicate the buck-boost mode if the input voltage $V_{in}$ is equal to the output voltage $V_{out}$ plus or minus a threshold value.

The control logic circuit 96 receives the mode signal MOD, the high-side comparison signal COMP_HS and the low-side comparison signal COMP_LS. Furthermore, in this embodiment, the control logic circuit 96 also receives the maximum current sensing signal IMAX_FLAG. The control logic circuit 96 generates the switch control signals T1, T2, T3 and T4 depending on the mode indicated by the mode signal MOD. In detail, the control logic circuit 96 may provide the switch control signals T1-T4 using, in buck mode, only the high-side comparison signal COMP_HS, as described with reference to FIG. 4. In boost mode, the control logic circuit 96 may only use the low-side comparison signal COMP_LS, in a known manner, for example so as to perform a peak current control also in boost mode.

The feedback circuit 254 also here comprises the compensation module 116 and a voltage-to-current conversion module 260 receiving the control voltage $V_c$, the calibration signal CAL and the mode signal MOD.

The voltage-to-current conversion module 260 also here comprises a voltage-controlled current generator 262 having a node 263 having the intermediate control current $I_c$ flowing therethrough, and a current mirror 265. The current mirror 265 is a current-limited mirror comprising a limiting portion 266 and an output portion 267. The limiting portion 266 has a transistor 270 coupled to the node 263 of the voltage-controlled current generator 262 and is traversed, in use, by a mirrored current $I_m$. The limiting portion 266 further has a buck branch 272 and a boost branch 273 mutually coupled in parallel between a node 274 and the ground 78.

The boost branch 273 is formed by a series circuit comprising a current generator 275, here fixed, and a switch 276 controlled by the mode signal MOD. The mode signal MOD commands the closing, in boost mode, and opening, in buck mode, of the switch 276. The buck branch 272 is formed by a series circuit comprising a variable current generator 280 and a switch 281 controlled by the mode signal MOD.

The variable current generator 280 is capable of providing a maximum current value Imax as a function of the calibration signal CAL. In detail, the variable current generator 280 comprises a parallel circuit coupled between a node 283 and the ground 78 and formed by a fixed generator 285 and a plurality of selectable generators, here three selectable generators 286A, 286B, 286C. The selectable generators 286A-286C are each formed by a series circuit comprising a respective switch 288 and a respective current generator 290.

The calibration signal CAL is also here a digital signal comprising three bits f0, f1, f2 each commanding the closing and opening of the switch 288 of a respective selectable generator 286A-286C.

The buck branch 272 also comprises the buffer 142 having an input coupled to the node 283 and providing the maximum current sensing signal IMAX_FLAG.

In a different embodiment, not shown here, the input of the buffer 142 may be coupled to the node 274; in this manner, the maximum current sensing signal I_MAX may also be used in boost mode.

The output portion 267 comprises a buck branch 293 and a boost branch 291, both coupled to the limiting portion 266 so as to provide a buck control current $I_{c\_buck}$ to the input 99 of the comparator 98 and, respectively, a boost control current $I_{c\_boost}$ to one node 292.

The low-side current detector 252 is formed by a comparator 295 having a first input 296 and a second input 297, and by a boost threshold generator 299 and an overcurrent threshold generator 300.

The boost threshold generator 299 comprises a resistor 302 having resistance R and a switch 304 arranged between the second input 297 of the comparator 295 and the node 292 of the limiting portion 267 and commanded by the mode signal MOD so as to be closed when the mode signal MOD indicates the boost mode and open when the mode signal MOD indicates the buck mode.

The overcurrent threshold generator 300 comprises a resistor 310, having resistance R and a current generator 311 coupled to the first input 296 of the comparator 295 through a switch 312. The switch 312 is commanded by the mode signal MOD so as to be closed when the mode signal MOD indicates the buck mode and open when the mode signal MOD indicates the boost mode. In practice, when the mode signal MOD indicates that the regulator 50 is in buck mode, the control device 250 operates in a manner similar to what has been described with reference to FIG. 4.

In boost mode, each cycle of the modulated signal PWM determines, in a per se known manner, an ON-phase and an OFF-phase. In the ON-phase of the boost mode, the first high-side switch 68 and the second low-side switch 83 are closed and the first low-side switch 69 and the second high-side switch 82 are open, thus allowing current to flow between the input node 51 and the ground 78, through the inductor 87. In the OFF-phase of the boost mode, the first high-side switch 68 and the second high-side switch 82 are closed and the first low-side switch 69 and the second low-side switch 83 are open, thus allowing current to flow between the input node 51 and the output node 54, through the inductor 87.

In detail, in this embodiment, when the mode signal MOD indicates that the regulator 50 is in boost mode, the control logic circuit 96 uses the low-side current detector 252 to determine the switching between the ON-phase and the OFF-phase. In this manner the control device 250 is capable of performing a peak current control both in buck mode and in boost mode.

In buck-boost mode, the control logic circuit 96 may generate the switch control signals T1-T4 so that the regulator 50 operates, for subsequent cycles of the modulated signal PWM, alternately in buck mode and in boost mode.

Finally, it is clear that modifications and variations may be made to the control device 55, 200, 250 and to the regulator 50 described and illustrated herein without thereby departing from the scope of the present invention. For example, the current mirrors 131, 217, 265 may be current-limited mirrors having a topology different from what shown, depending on the specific application. For example, the variable current generator 137 may be a DAC having a binary or thermometric operation.

The update circuit 152 may be configured to perform a logic function different from the one described with reference to FIG. 4, depending on the specific application. For example, the update circuit 152 may be configured to update the calibration signal CAL using a bisection algorithm. For example, the high-side current detector 94 may be coupled to another resistive element arranged in the high-side 88 of the switching circuit 53, for example to the first high-side switch 68.

Additionally, or alternatively, the low-side current detector 95 may be coupled to another resistive element arranged in the low-side 89 of the switching circuit.

Furthermore, the shunt resistor may be arranged in a different position in the switching circuit 53 with respect to what has been shown in FIGS. 4, 8 and 9.

The control device may also comprise a further current detector coupled to the first or the second low-side switches 69, 83, whose threshold may be controlled in a manner similar to what has been described for the high-side current detector; in this case, the control device may also be used as a detector of a current recirculation mode, wherein the current in the switching circuit only flows in the low-side 89 of the switching circuit 53, through the first and the second low-side switches 69, 83. For example, the control device may use further control modes known per se, such as the valley current control mode.

For example, the high-side current detector 94 may be formed by two distinct comparators coupled in parallel to the first or the second high-side switches 68, 82, each having a respective trigger threshold, wherein one of the comparators is used to sense whether the inductor current is greater than the maximum current and the other comparator is used as a control comparator to determine the duration of the ON-phase. Similarly, the low-side current detector 95 may also be formed by two distinct comparators.

The high-side current detector 94, the low-side current detector 95, the control logic circuit 96, the calibration circuit 149 and the feedback circuit 92 are modules that may be provided as analog, digital or mixed-signal circuits, depending on the specific application.

The described embodiments may be combined to form further solutions.

What is claimed is:
1. A control device for a buck or buck-boost type switching voltage regulator, the control device comprising:
   a first current detector configured to sense a first measurement signal indicative of a current flowing through a first side of a switching circuit of the voltage regulator, and to provide a first comparison signal as a function of the first measurement signal and of a first threshold;
   a second current detector configured to sense a second measurement signal indicative of a current flowing through a second side of the switching circuit of the voltage regulator, and to provide a second comparison signal as a function of the second measurement signal and of a second threshold;
   a driving-signal generation circuit configured to generate a switching control signal, based on the first comparison signal, to drive the switching circuit;
   a calibration circuit configured to receive an alert signal indicative of a value of the first threshold, to compare the alert signal and the second comparison signal, and to provide a calibration signal in response to the comparison between the alert signal and the second comparison signal; and
   a feedback circuit configured to receive the calibration signal and an error signal indicative of a difference between an output voltage of the switching circuit and a nominal voltage, and to provide a loop control signal as a function of the error signal and of the calibration signal,
   wherein the first current detector is configured to modify the first threshold based on the loop control signal, wherein the first threshold is a function of the calibration signal.

2. The control device according to claim 1, wherein the calibration circuit is further configured to modify the calibration signal when the second comparison signal indicates that the second measurement signal is greater than the second threshold or when the alert signal indicates that the first threshold has reached an alert value.

3. The control device according to claim 1, wherein:
   the first threshold determines a first current threshold of the first current detector;
   the second threshold determines a second current threshold of the second current detector; and
   the calibration circuit is configured to modify the calibration signal to cause the first current threshold to match the second current threshold.

4. The control device according to claim 1, wherein:
   the loop control signal is a current signal; and
   the feedback circuit includes a compensation circuit and a voltage-to-current conversion circuit;
   the compensation circuit is configured to generate a control voltage from the error signal;
   the voltage-to-current conversion circuit is configured to receive the control voltage and the calibration signal; and
   the voltage-to-current conversion circuit is configured to generate the loop control signal based on the control voltage, as the function of the calibration signal.

5. The control device according to claim 4, wherein:
   the voltage-to-current conversion circuit is current limited, so that the loop control signal is less than or equal to a maximum current value;
   the maximum current value determines an alert value of the first threshold;
   the alert signal indicates whether the loop control signal has reached the maximum value; and the voltage-to-current conversion circuit is configured to modify the maximum value as the function of the calibration signal.

6. The control device according to claim 5, wherein:
the voltage-to-current conversion circuit comprises a voltage-controlled current generator and a current mirror;
the voltage-controlled current generator is configured to generate an intermediate control current based on the control voltage; and
the current mirror is configured to generate the loop control signal by
mirroring the intermediate control current when the intermediate control current is less than or equal to the maximum value, and
mirroring the maximum current value when the intermediate control current is greater than the maximum value.

7. The device according to claim 5, wherein the voltage-to-current conversion circuit comprises a variable current generator comprising at least one selectable element configured to set the maximum value of the loop control signal, the variable current generator being configured to activate or deactivate the at least one selectable element as the function of the calibration signal.

8. The control device according to claim 4, wherein the voltage-to-current conversion circuit further has a variable current gain and is configured to modify the variable current gain as a function of a calibration signal.

9. The control device according to claim 1, wherein:
the switching circuit is a four-switch switching circuit;
the first side is a high side portion of the switching circuit; and
the second side is a low side portion of the switching circuit.

10. The control device according to claim 1, wherein:
the switching circuit is a four-switch switching circuit comprising a resistive shunt element;
the first measurement signal is a function of a resistance value of one of the switches of the switching circuit; and
the second measurement signal is a function of a resistance value of the resistive shunt element.

11. A switching voltage regulator of the buck or buck-boost type comprising the control device according to claim 1, wherein the first current detector is coupled at an input to the first side of the switching circuit, the second current detector is coupled at an input to the second side of the switching circuit.

12. A control method for a buck or buck-boost type switching voltage regulator comprising a switching circuit having a first side and a second side, and a control device, the control method comprising:
providing a first comparison signal as a function of a first measurement signal and a first threshold, the first measurement signal being indicative of a current flowing through the first side of the switching circuit;
providing a second comparison signal as a function of a second measurement signal and of a second threshold, the second measurement signal being indicative of a current flowing through the second side of the switching circuit;
generating a switching control signal, based on the first comparison signal, to drive the switching circuit;
receiving an alert signal indicative of a value of the first threshold;
comparing the alert signal with the second comparison signal;

providing a calibration signal in response to the comparison between the alert signal and the second comparison signal; and
modifying the first threshold as a function of the calibration signal and of an error signal indicative of a difference between an output voltage of the switching circuit and a nominal voltage.

13. The control method according to claim 12, further comprising modifying the calibration signal when the second comparison signal indicates that the second measurement signal is greater than the second threshold or when the alert signal indicates that the first threshold reaches an alert value.

14. The control method according to claim 12, wherein:
the first threshold determines a first current threshold;
the second threshold determines a second current threshold; and
the calibration signal is configured to modify the first current threshold to match the second current threshold.

15. The control method according to claim 13, wherein modifying the calibration signal comprises:
lowering the first threshold when the second comparison signal indicates that the second measurement signal is greater than the second threshold; and
increasing the first threshold when the alert signal indicates that the first threshold reaches the alert value and the second comparison signal indicates that the second measurement signal is less than the second threshold.

16. The control method according to claim 12, further comprising:
providing a loop control signal by generating a control voltage and converting the control voltage into an intermediate current, wherein
the loop control signal is equal to the intermediate current when the intermediate current is lower than or equal to a maximum value,
the loop control signal is equal to the maximum current value when the intermediate current is greater than the maximum value, and
the calibration signal modifies the maximum current value.

17. The control method according to claim 12, wherein:
the switching control signal has a period and a duty cycle;
generating the switching control signal comprises modifying the duty cycle of the switching control signal as a function of the first comparison signal; and
comparing the alert signal and the second comparison signal is performed within the period of the switching control signal.

18. A method of operating a power converter comprising two half-bridges coupled to a common current sensing resistor, the method comprising:
monitoring a voltage across the common current sensing resistor using a first comparator;
adjusting a threshold of a second comparator having inputs coupled across a high-side switch of the power converter to match a determined proportion of a threshold of the first comparator based on the monitoring; and
using the second comparator to sense a current of the power converter when the power converter operates in a buck mode.

19. The method of claim 18, wherein adjusting the threshold of the second comparator comprises:
monitoring an output of the first comparator during an off-time of an operation cycle of the power converter;
monitoring an output of the second comparator during an on-time of the operation cycle of the power converter;

increasing the threshold of the second comparator when the second comparator is activated during the on-time and the first comparator is not activated during the off-time; and decreasing the threshold of the second comparator when the first comparator is activated during the off-time.

20. The method of claim 19, wherein adjusting the threshold of the second comparator further comprises:

using a control loop to adjust the threshold of the second comparator;

decreasing the threshold of the second comparator comprises decreasing a loop gain of the control loop; and increasing the threshold of the second comparator comprises increasing the loop gain of the control loop.

* * * * *